P. M. WHITE.
STAIR CLIMBING HAND TRUCK.
APPLICATION FILED MAY 3, 1919.
1,334,726.
Patented Mar. 23, 1920.
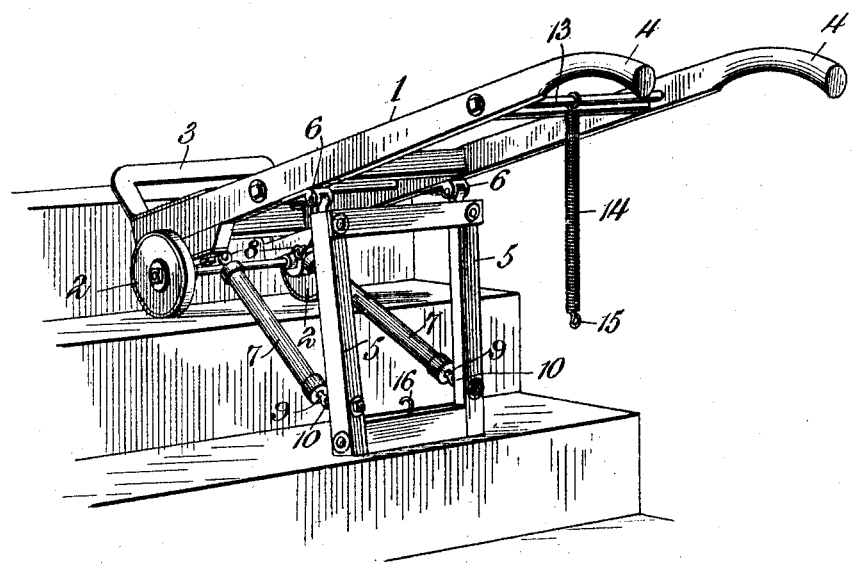
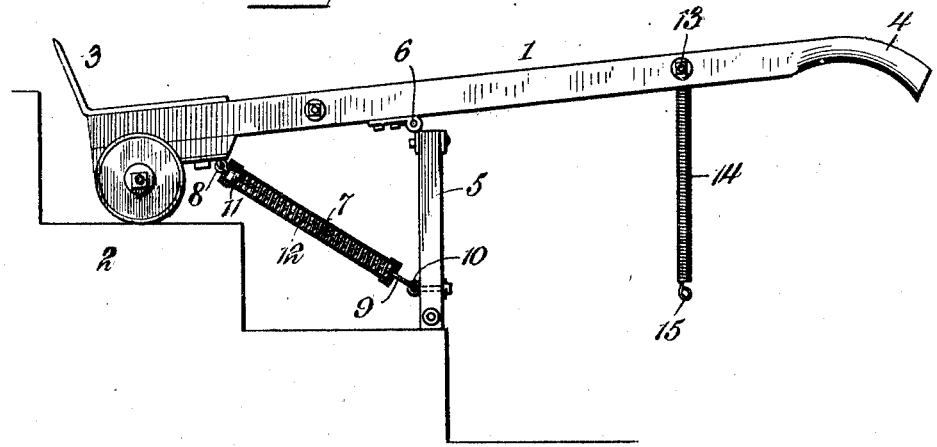
WITNESSES
Charles N. Ourand
F. T. Chapman.
Parren M. White
INVENTOR
BY
C. G. Siggers
ATTORNEY

UNITED STATES PATENT OFFICE.

PARREN M. WHITE, OF RAVENNA, OHIO.

STAIR-CLIMBING HAND-TRUCK.

1,334,726.                    Specification of Letters Patent.    Patented Mar. 23, 1920.

Application filed May 3, 1919. Serial No. 294,521.

*To all whom it may concern:*

Be it known that I, PARREN M. WHITE, a citizen of the United States, residing at Ravenna, in the county of Portage and State of Ohio, have invented a new and useful Stair-Climbing Hand-Truck, of which the following is a specification.

This invention has reference to hand trucks, and its object is to provide a truck whereby trunks or boxes, or the like, may be easily and expeditiously moved up stairways.

In accordance with the invention a hand truck, which may be of the ordinary warehouse type, is provided with an intermediate leg or support pivoted to the truck and held in a suitable position by spring structures limited in movement in one direction and extensible in the other direction, the arrangement being such that by rocking the truck on the support it may be progressively impelled upwardly from step to step with little effort, while at the same time carrying a relatively heavy load.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawings:—

Figure 1 is a perspective view showing the truck in position to carry a load up a stairway.

Fig. 2 is a side elevation, with some parts in section, of the improved truck.

Referring to the drawing, there is shown a truck 1 having forward truck wheels 2, the usual retaining lip 3 and handles 4. These are parts common to warehouse trucks and require no special description. It will be understood, however, that the lines of a warehouse truck need not be strictly followed. Between the ends of the truck and pivoted to the sides thereof is a support 5 shown in the drawing as a rectangular frame but this support may be otherwise formed, its function being that of a leg intended to engage a step of a series of steps with the wheels resting upon the next higher step. The support or leg 5 has hinge connections 6 with the under edges of the side bars of the truck frame so that the lower end of the leg 5 may move forwardly or rearwardly with relation to the truck. Connected to the body of the truck, near the wheels 2, is one end of a tube or housing 7, the connection being indicated at 8. Entering that end of the tube 7 remote from the connection 8 is a rod 9 pivotally connected, as shown at 10, with the lower end portion of the leg 5, there being two such tubes 7 and rods 9 on opposite sides of the truck. Each rod 9 is provided inside of its tube 7 with a head 11 and surrounding the rod 9 within the tube 7 is a coil spring 12, the arrangement being such that the spring has a constant tendency to draw the rod 9 into the tube but yielding to a force tending to move the rod out of the tube.

Near the rear end of the truck frame is a cross bar 13 having one end of a coil spring 14 connected thereto, the other end of the spring being formed with a loop 15 for engagement with a hook 16 on the lower end of the leg 5.

When the parts are in normal position the leg 5 is held nearly or quite perpendicular to the length of the truck by the springs 12 with the indrawing of the rods 9 limited by the tubes 7. With the parts in such position the truck will rest upon a level surface with the body of the truck at a considerable angle determined by the length of the leg 5. If, now, the body of the truck be loaded the truck may be moved along a level surface with the leg 5 free therefrom and the truck in the position in which it is usually propelled along a level surface. When a stairway is reached the truck, with the wheels 2 close to the riser of the lowest step of the stairway, is tilted by downward pressure applied to the handles 4 and with the leg 5 resting upon the level surface until the wheels 2 are sufficiently raised to move upon the tread of the first step. Then the truck is pushed forwardly so that the wheels 2 are over the tread of the first step, this being permitted by the turning of the leg 5 upon the hinges 6 and the outward movement of the rods 9 against the normal action of the springs 12.

Now, by depressing the handles 4, the wheels 2 may be lifted until they pass upon the tread of the first step and by again lifting upon the handles 4 so as to raise the leg 5 from the level surface the leg is brought back to its perpendicular relation to the body of the truck and the wheels 2 may be moved to the riser of the second step. Then by again depressing the handles 4 and pushing forwardly on the truck the latter may be turned upon the hinge 6 with the leg 5 still engaging the level surface, thus lifting the wheels 2 onto the tread of the second step with the leg 5 still engaging the floor but rocking upon the hinges or pivots 6, the springs 12 yielding accordingly. Then by once more raising the handle end of the truck the leg 5 is returned by the reaction of the springs 12 to the relatively perpendicular position and utilizing the axis of the wheels 2 as a fulcrum the leg 5 is lifted to the tread of the first step. By repeating this action the truck with its load is rocked from step to step with the wheels 2 and the hinges 6 of the leg 5 serving as fulcrums, thereby permitting the truck to be readily moved up the stairway by alternately rocking the truck and moving it forwardly, the operation being performed with little effort, since advantageous leverage is obtained at all times. By reversing the operation the truck with its load may be moved down the stairway.

Loads of various kinds usually carried upon the shoulder of a porter or other person, or requiring the coöperative efforts of two or more persons, are moved up or down stairways more expeditiously and with greater ease with the truck than without it and also without damage to the stairway or parts of a building along the stairway. By use of the truck a trunk may be readily carried up or down a stairway without danger of marring the walls or the balustrades where present, or of injuring lighting fixtures. At the same time the loads are moved up or down the stairways with but a minimum of effort on the part of the person manipulating the truck.

When the truck is to be used for ordinary movements upon level surfaces the spring 14 may be attached to the leg 5 by means of the hook 16, thereby balancing the leg 5, or if the spring 14 be made strong enough it may be made to overcome the springs 12 and move the leg 5 on the hinges 6 so that its lower end will be at a less distance from the body of the truck than when the truck is arranged for stair-climbing.

What is claimed is:—

1. A stair-climbing truck provided with truck wheels at one end and handles at the other, an intermediately located leg pivotally connected to the body of the truck and having spring connections with the wheel end of the truck, and means carrying the springs for limiting the movement of the leg toward the wheel end of the truck under the action of the spring connections.

2. A stair-climbing truck provided with truck wheels at one end and handles at the other end, an intermediately located leg structure pivotally connected at one end to the body of the truck, springs connecting the wheel end of the truck with that portion of the leg remote from the truck body, and housings for the springs limiting the movement of the leg toward the wheel end of the truck for permitting movements of the leg about its pivotal connection away from the wheel end of the truck.

3. A stair-climbing truck having truck wheels at one end and handles at the other end, a leg carried by and pivoted to the truck intermediate of the length of the latter and of a height to permit the truck wheels to rest upon the tread of a step with the leg on the tread of the next lower step, and spring connections between the lower portion of the leg and the wheel end of the truck, said spring connections being provided with means for limiting the movement of the leg toward the wheels under the action of the springs.

4. A stair-climbing truck comprising a truck body with truck wheels at one end and handles at the other end, a leg structure hinged or pivoted at one end to the truck body intermediate of the length thereof with the other end adapted to rest on a support and the height of the leg being greater than the height of a step of the stairway, tubular members each connected at one end to the wheel end of the truck, rods entering the tubular members and connected to the leg, and springs surrounding and engaging the rods where within the tubular members, said springs being housed in the tubular members.

5. A stair-climbing truck comprising a truck body with truck wheels at one end and handles at the other end, a leg structure hinged or pivoted at one end to the truck body intermediate of the length thereof with the other end adapted to rest on a support and the height of the leg being greater than the height of a step of the stairway, tubular members each connected at one end to the wheel end of the truck, rods entering the tubular members and connected to the leg, and springs surrounding and engaging the rods where within the tubular members, said springs being housed in the tubular members, and said truck being provided with a spring connected to the truck body near the handle end and adapted to be connected to the leg at the supporting end of the latter and forward of the connection of the spring with the truck body.

In testimony that I claim the foregoing as my own I have hereto affixed my signature.

PARREN M. WHITE.

Witnesses:
H. W. CAMPBELL,
LUVA S. COIT.